United States Patent [11] 3,604,515

[72] Inventor Konrad Kipping
 Breslauer Strasse 34a, 8910
 Landsberg, Lech, Germany
[21] Appl. No. 804,218
[22] Filed Mar. 4, 1969
[45] Patented Sept. 14, 1971
[32] Priority Mar. 5, 1968
[33] Germany
[31] P 16 32 772.3

[54] DEVICE FOR CUTTING FURROWS IN THE GROUND
 5 Claims, 8 Drawing Figs.
[52] U.S. Cl. .................................................. 172/60,
 172/96, 172/123, 172/771, 111/87
[51] Int. Cl. ............................................. A01b 33/00,
 A01b 35/20
[50] Field of Search ........................................... 172/42, 91,
 96, 112, 122, 123, 117, 544, 556, 395, 765, 771,
 60, 540, 548, 554; 111/85, 86, 87, 6

[56] References Cited
 UNITED STATES PATENTS
 3,029,879 4/1962 Wells .......................... 172/395 X
 3,087,557 4/1963 Hohstadt ..................... 172/556
 3,247,812 4/1966 Luciano et al. ............... 172/117 X
 3,477,515 11/1969 Kiemele et al. .............. 172/544 X
 3,110,275 11/1963 Bonney ....................... 172/556 X
 FOREIGN PATENTS
 560,581 10/1923 France ......................... 172/540

Primary Examiner—Robert E. Pulfrey
Assistant Examiner—Stephen C. Pellegrino
Attorney—Low and Berman ABSTRACT: A device for cutting furrows in the ground having a wheel rotating about a horizontal axis, and two axially spaced groups of circumferentially spaced shovels are mounted on the wheel in such a manner that radially elongated digging portions of the shovels project beyond the wheel circumference. Each digging portion has two digging edges which converge at an acute angle in a radially outward direction to form a point obliquely directed toward the plane of rotation of the wheel which is arranged between the two groups.

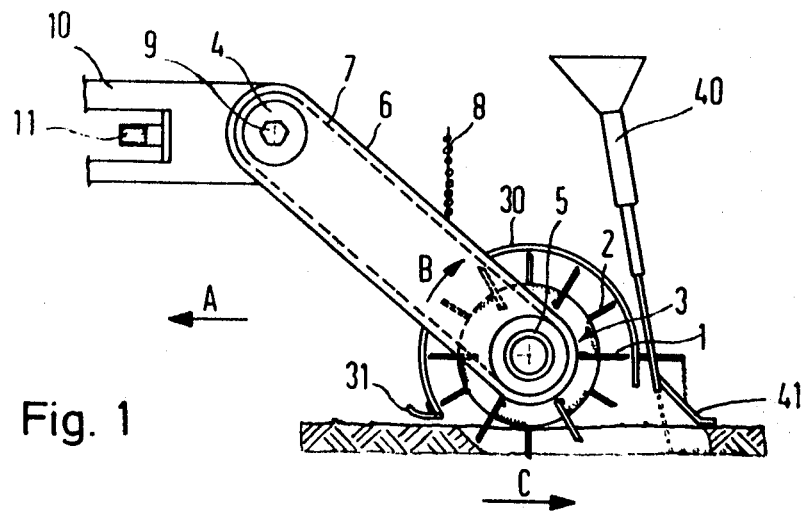
Fig. 1
Fig. 3
Fig. 2
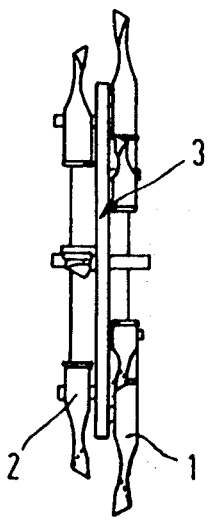
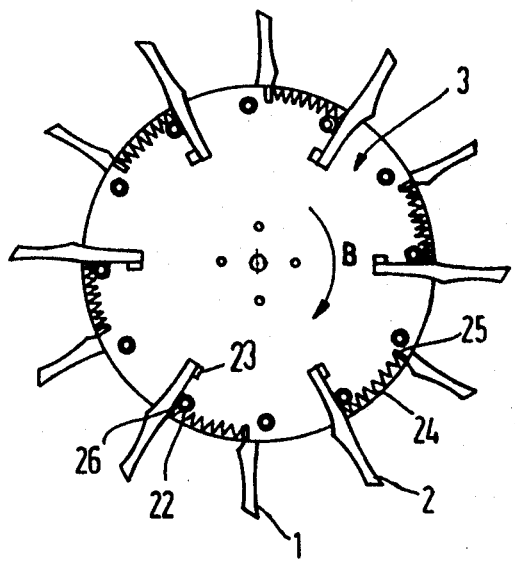
INVENTOR
Konrad Kipping
By: Low and Berman
Agents

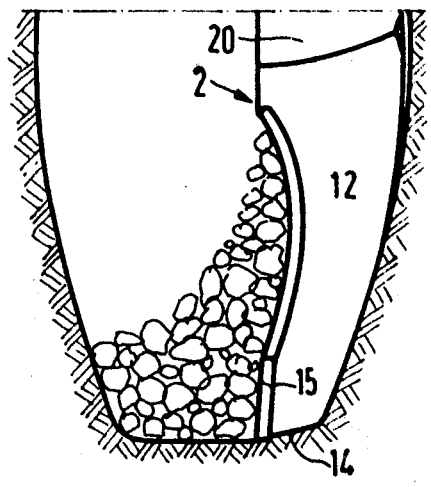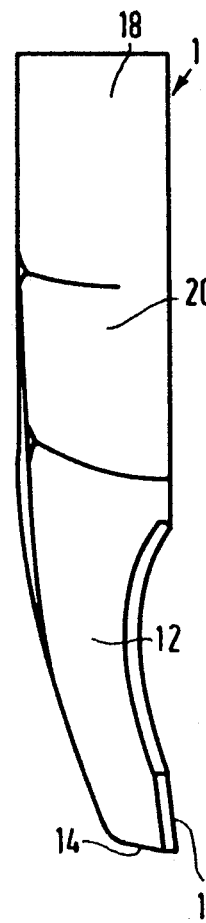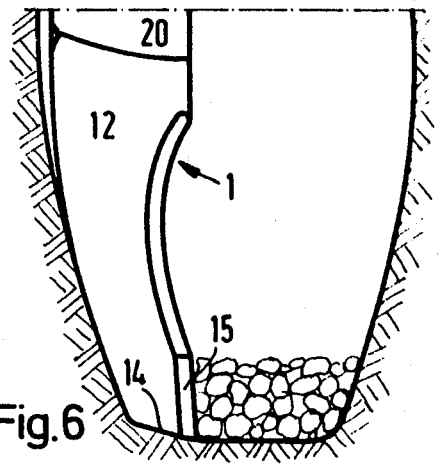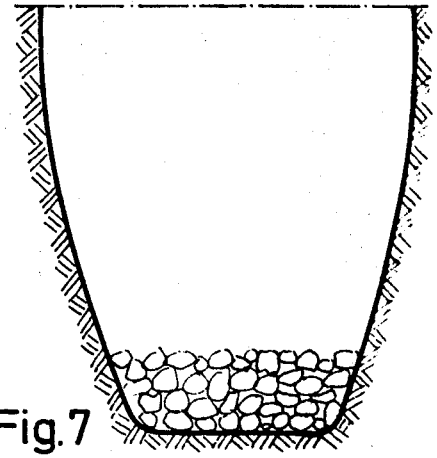

DEVICE FOR CUTTING FURROWS IN THE GROUND

This invention relates to a device for cutting furrows in the ground by means of a wheel which carries shovels and is driven oppositely to its natural direction of movement over the ground.

A device of this type is known per se. In it, the wheel comprises all-round toothlike projections which dig into the ground. The shovels are disposed on both sides of the wheel and are offset radially inwardly. Pairs of shovels are arranged at equal angles on both sides of the wheel. The object of the known wheel is to dig an open furrow in the soil and to scarify the soil on both sides of the furrow to a uniform depth. In loose soil this wheel operates satisfactorily but not on previously watered ground. It does not produce crumbling at the furrow bottom as is necessary to facilitate the penetration of the seedling into the lower soil strata during the first few days of its root growth.

The toothlike projections on the wheel merely cut and squash previously watered soil, so that the latter rapidly binds together again.

In soils containing stones, which is usually the case, the known wheel can hardly be used, if at all. The stones repeatedly wedge themselves between the toothlike projections, making trouble-free operation impossible. The toothlike projections of the wheel are easily damaged on running against larger stones; furthermore, the wheel may jump out of the furrow.

Known sowing plowshares or disc plowshares are not satisfactory when used in irrigated soils in the more torrid zones because the top layer of the irrigated soils forms a crust extremely rapidly, making penetration of the plowshare into the earth exceedingly difficult.

The object of the invention is to provide a device of the type referred to at the beginning which is particularly suitable for use in soils in arid zones. It is intended simultaneously to cut an open furrow and to loosen the soil at the deepest point of the furrow. The seeds can drop through a sowing tube known per se combined with the device into the loosened soil in the bottom of the furrow. Smooth-over or closing means known per se fitted to the device behind the sowing tube can then cover the seeds with the loose soil thrown up on both sides of the furrow.

In particular, the device is to be used after a watering as is usual in arid zones about 6 to 10 days before sowing, when the soil has already set. Under these conditions, a crumbling of the soil on the furrow bottom cannot be obtained satisfactorily with the known means.

The invention will be described with reference to one example of embodiment hereinafter with the aid of the attached drawings, wherein:

FIG. 1 shows a device according to the invention in side elevation;

FIG. 2 shows the wheel of a device according to the invention in side elevation (enlarged with respect to FIG. 1);

FIG. 3 shows the wheel according to FIG. 2 in front view;

FIG. 4a shows a shovel of a device according to the invention seen in the direction of the arrow C of FIG. 1;

FIG. 4b shows the shovel according to FIG. 4a as viewed in the direction of the arrow F of FIG. 4a;

FIGS. 5, 6 and 7 explain the mode of operation of the shovels in a device according to the invention.

The same reference numerals denote the same or similar components.

The device according to the example of embodiment comprises at least one wheel 3 which carries plate-shaped, radially elongated shovels 1 and 2 and which is driven oppositely to its natural direction of movement over the ground (direction of the arrow A), i.e. in the direction of the arrow B. The drive is effected via two chainwheels 4 and 5 round which runs a chain 7 enclosed by a protective casing 6. The protective casing 6 may be raised or lowered by means of a chain 8 for raising or lowering the wheel 3. The chainwheel 4 is mounted on the output shaft 9 of a gearbox 10 whose input shaft 11 is coupled for example to the power takeoff of a tractor.

The two groups of shovels 1 and 2 are axially spaced. Shovels of the two groups alternate circumferentially on respective sides of the wheel 3 and project substantially radially beyond the periphery of the wheel.

All the shovels 1 and 2 comprise digging portions 12 with digging edges 14, 15 which converge radially outwardly at an acute angle to form a point directed obliquely towards the plane of the wheel 3. The digging portions 12 of the shovels 1 and 2 are integrally connected by twisted portions 20 to support portions 18 of the shovels 1 and 2 extending substantially in planes through the axis of the wheel 3 and in a common radial plane.

The digging portions 12 are bent out of the axial planes of the associated support portions 18 oppositely to the digging direction, i.e. in the direction of the arrow C. In FIGS. 4a, 5 and 6, the digging portions 12 are thus bent obliquely relative to the plane of the paper.

The shovels 1 and 2 are articulately connected to hinge pins 22 on the wheel by eyes 21 and bear with their radially inner ends normally on abutments 23, against which the shovels 1 and 2 are pressed by means of pressure springs 24. Said springs 24 bear on the one hand on abutments 25 on the wheel 3 and engage on the other hand guide pins 26 of the shovels 1 and 2 disposed radially outside the pivot points 22. The shovels 1 and 2 are thus secured on the wheel resiliently to yield to an excessive force acting thereon during digging.

Arranged on a member 30 fixed with respect to the axis of the wheel 3, in front of the wheel in the direction of movement, is a skid 31.

A seed dispensing device 40 and a furrow smoothing-over or closing device 41 are arranged on the device behind the wheel in the direction of movement.

The mode of operation of the device described is as follows:

A first shovel 1 entering the ground cuts out an amount of earth corresponding to the size of said shovel. A second shovel 2 disposed on the other side of the wheel 3 then enters the soil and scoops out in turn an amount of earth corresponding to its size. This process is shown in FIG. 5. The first shovel 1 works one-half of one furrow and the second shovel 2 the other half of the furrow. The soil between the two shovels is crumbled and collapses. The following shovels dig into parts of the soil offset in the direction of the arrow A and only loosen the earth left in the furrow by the first two shovels. FIG. 6 shows this for the following shovel 1. The earth loosened in the furrow bottom collapses as is shown in FIG. 7. The amount of loosened earth on the furrow bottom is determined inter alia by the degree of bending of the digging portions of the shovels and by the magnitude of the axial distance of the shovels from each other.

What I claim is:

1. A device for cutting furrows in the ground comprising, in combination:
    a. a wheel having an axis; means for supporting said wheels,
    b. drive means on said supporting means for rotating said wheel about said axis while said axis extends horizontally;
    c. Two axially spaced groups of shovel members mounted on said wheel.
        1. the shovel members of each group being circumferentially spaced from each other and defining respective axial planes,
        2. each shovel member having a plate-shaped digging portion projecting from said wheel in a radially outward direction and obliquely inclined relative to the associated axial plane,
        3. said digging portion having two digging edges converging in a radially outward direction so as to define a point,
        4. said point being directed toward the other group of shovel members in a direction obliquely inclined relative to the plane of rotation of said wheel.

2. A device as set forth in claim 1, wherein the shovels of said two groups circumferentially alternate.

3. A device as set forth in claim 2, further comprising yieldably resilient mounting means securing each shovel member to said wheel for relative movement and resiliently impeding movement of said digging portion in one circumferential direction.

4. A device as set forth in claim 2, wherein said digging portions are elongated in a substantially radial direction.

5. A device as set forth in claim 4, wherein said wheel is axially interposed between said groups of shovel members, said points of said shovel members being directed toward said plane or rotation.